United States Patent
Kuenzi et al.

(10) Patent No.: US 9,471,048 B2
(45) Date of Patent: Oct. 18, 2016

(54) SYSTEMS AND METHODS FOR LOCK ACCESS CONTROL MANAGEMENT USING SOCIAL NETWORKS

(71) Applicant: UTC FIRE & SECURITY AMERICAS CORPORATION, INC., Bradenton, FL (US)

(72) Inventors: Adam L Kuenzi, Silverton, OR (US); Jonah J Harkema, Newberg, OR (US)

(73) Assignee: UTC FIRE & SECURITY AMERICAS CORPORATION, INC., Bradenton, FL (US)

( * ) Notice: Subject to any disclaimer, the term of this patent is extended or adjusted under 35 U.S.C. 154(b) by 673 days.

(21) Appl. No.: 13/783,227

(22) Filed: Mar. 1, 2013

(65) Prior Publication Data
US 2013/0293351 A1 Nov. 7, 2013

Related U.S. Application Data

(60) Provisional application No. 61/641,386, filed on May 2, 2012.

(51) Int. Cl.
*B60R 25/00* (2013.01)
*G05B 15/00* (2006.01)
*G07C 9/00* (2006.01)
*G06F 21/35* (2013.01)

(52) U.S. Cl.
CPC ............. *G05B 15/00* (2013.01); *G06F 21/35* (2013.01); *G07C 9/00309* (2013.01); *G07C 9/00896* (2013.01); *G06F 2221/2111* (2013.01); *G06F 2221/2137* (2013.01)

(58) Field of Classification Search
None
See application file for complete search history.

(56) References Cited

U.S. PATENT DOCUMENTS

| | | |
|---|---|---|
| 6,975,202 B1 | 12/2005 | Rodriguez et al. |
| 2007/0266081 A1 | 11/2007 | Murchison, III et al. |
| 2009/0066476 A1 | 3/2009 | Raheman |
| 2009/0153291 A1* | 6/2009 | Larson ............... E05B 19/0005 340/5.33 |
| 2009/0256676 A1 | 10/2009 | Piccirillo et al. |
| 2010/0176919 A1* | 7/2010 | Myers ............... G07C 9/00571 340/5.73 |
| 2011/0288891 A1* | 11/2011 | Zaid ....................... G06Q 10/02 705/4 |
| 2012/0129493 A1* | 5/2012 | Vasudevan ............. B60R 25/24 455/411 |

* cited by examiner

*Primary Examiner* — Ojiako Nwugo
(74) *Attorney, Agent, or Firm* — Cantor Colburn LLP

(57) ABSTRACT

A system for managing accessing to a locking device is disclosed. A group of users can register with a social networking service and an access management application hosted by the social networking service. A first user can grant, to a second user connected to the first user, access to the locking device and contents thereof. The access management application can notify the second user of the access, and the second user can initialize a mobile application on a mobile device. The mobile application can synchronize with the access management application to verify credentials of the second user. The second user can use the mobile device to connect, via a short-range communication connection, to the locking device and open the locking device.

18 Claims, 3 Drawing Sheets

US 9,471,048 B2

SYSTEMS AND METHODS FOR LOCK ACCESS CONTROL MANAGEMENT USING SOCIAL NETWORKS

This application claims the benefit of Provisional U.S. Patent Application No. 61/641,386, filed May 2, 2012, which is incorporated herein by reference in its entirety.

FIELD

The systems and methods pertain to access control management. More particularly, the systems and methods pertain to an access control system integrated with a social networking platform or service.

DESCRIPTION OF THE PRIOR ART

Consumers and businesses have access control needs that benefit from mechanical or electronic access control solutions. For example, real estate agents can use key lock boxes that store keys accessible to clients with proper access Personal Identification Numbers (PINS) or other credentials. Further, some solutions allow a user to gain access to a locking device via an internet connection. Some of the solutions can be "closed," wherein all of the users belong to the same organization and are known to each other, while other solutions are "open," wherein all of the users are not known at any point in time.

Generally, "closed" systems are snore secure than "open" systems. "Closed" systems can typically allow for two or more levels of authentication. For example, a "closed" system can require a passcode or a key in addition to requiring personal credentials, such as personal data or biometric identification. Conversely, an "open" system typically only requires a single level of authentication, since personal data or biometric information may not be available for unknown users.

Existing solutions to increased security in "open" systems require extensive hosting and implementation services and costs, which can prove expensive to the consumers and businesses offering the solutions. In particular, the existing solutions necessitate the consumers and businesses to pay for hosting and implementing software, networks, and other hardware and software components.

Accordingly, there is a need for access control systems that minimizes the hosting and implementation costs. In particular, there is a need for platforms and techniques for providing access control management features that facilitate an interaction with a scaled-down hosted system supplying inter-connectivity to mobile devices and locking mechanisms.

SUMMARY

According to embodiments, a system for managing access to a locking device is disclosed. The system comprises a server configured to host a social networking service storing access data. Further, the system comprises a processor configured to execute an application within the social networking service. The application is configured to associate the locking device with a social networking account belonging to a first user, receive a request from the first user to allow a second user access to the locking device and store access control data to the server. Further, the application is configured to notify the second user of the access to the locking device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DESCRIPTION OF THE EMBODIMENTS

With reference now to the various drawing figures in which identical elements are numbered identically throughout, a description of the embodiments will now be provided.

Figure 1:
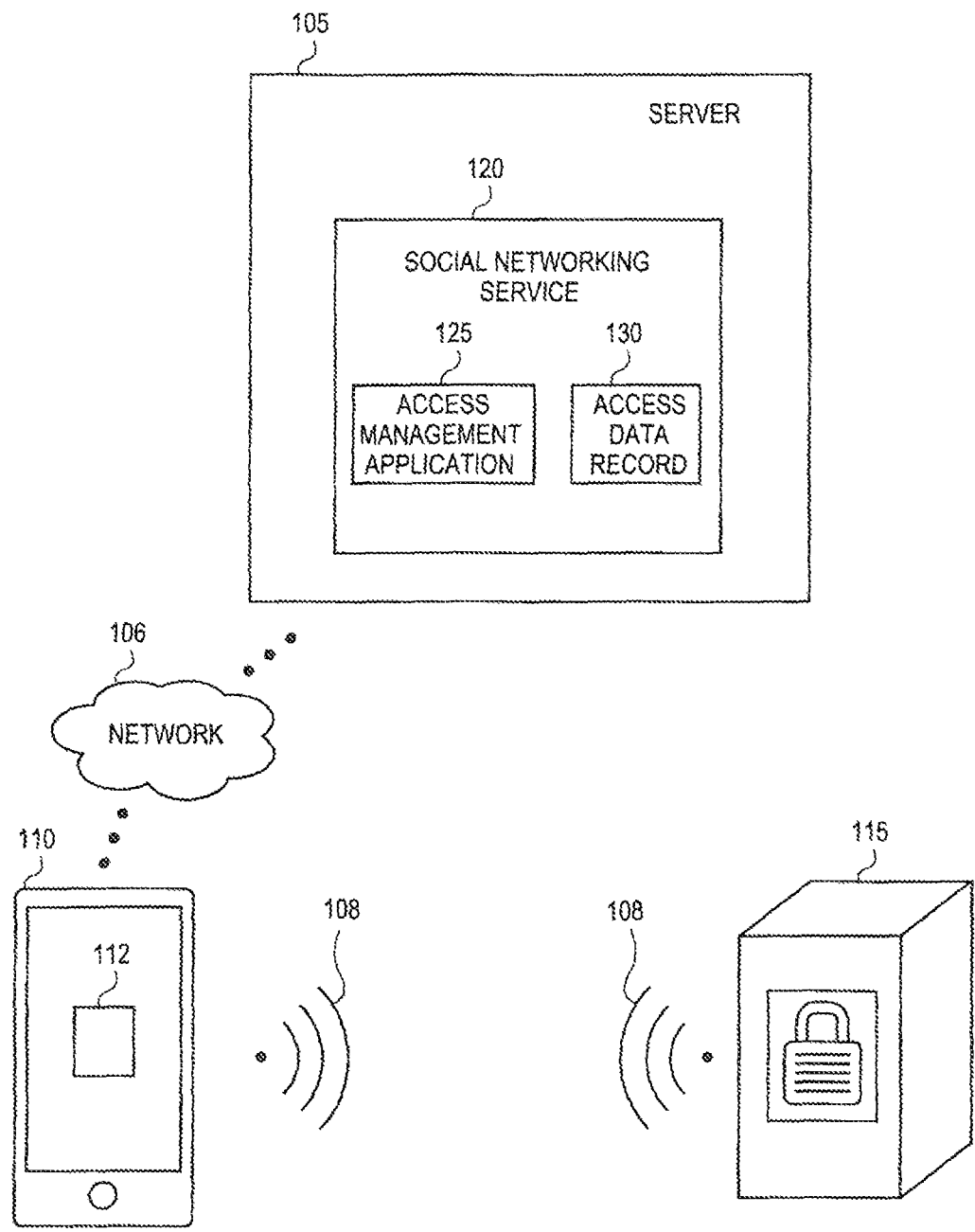
FIG. 1 illustrates an exemplary access management environment in accordance with some embodiments.

FIG. 1 depicts an environment 100 comprising components according to embodiments. It should be appreciated that the environment 100 is merely exemplary and can comprise various combinations and types of components.

Referring to FIG. 1, the environment 100 comprises a server 105 in communication with a mobile device 110. For instance, the server 105 can communicate with the mobile device 110 via a network 106, such as a cellular network including one or more cell sites or base stations, or other wide area networks. In some cases, the network 106 can be a local area network.

The server 105 can have a social networking service 120 implemented thereon. In particular, the social networking service 120 can be an online service or platform that allows users to form and build social networks or relations with other users of the service. In some implementations, each user of the social networking service 120 can have a profile or other type of representation, the user's social links, interests, or other data, and a variety of additional services. For example, the social networking service 120 can be Facebook®, Google+®, MySpace®, Twitter®, LinkedIn®, or other social networking services. According to embodiments, the social networking service 120 can be implemented by a combination of hardware and software components of the server 105.

In embodiments, a first user's profile can be connected to a second user's profile, for example, as a "friend" or a "connection," within the same social network. For example, a first user can identify a second user as a "friend" on Facebook® or a "connection" on LinkedIn®. Based on such identification, the social networking service 120 can associate or connect the profile of the first user with the profile of the second user. Hereinafter, two or more social networking accounts or profiles are "connected" when the users have been identified as, for example, "friends" or "connections" and an association or connection between the profiles is established by the social networking service 120. Additionally, in certain embodiments, the social networking service 120 can require the second user to confirm that he/she consents to being "connected" to or identified as "friends" with the first user before the profile of the first user is associated or connected with the second user.

The social networking service 120 can implement and/or support an access management application 125. For example, the access management application 125 can be developed by a third party separate from the social networking service 120. Further the access management application 125 can be implemented and executed via hardware and software components of the social networking service 120, and can interface with the profiles and other information of the users of the social networking service 120. For instance, the users of the social networking service 120 can opt-in to access the access management application 125 and the functions thereof. According to implementations, the access management application 125 can be implemented, updated, or otherwise managed by an appropriate administrator of a third party company, individual, or other entity.

The access management application 125 can facilitate and/or manage access to a network of locks, lock boxes and/or similar locking devices, such as the locking device 115 as shown in FIG. 1. More particularly, an entity that manages access to the locking device 115 can implement and manage the access management application 125 to facilitate the management of the locking device 115. For example, the entity can use the access management application 125 to grant access, revoke access, run a report, manage assets, and/or perform other functions. The locking device 115 can be an actual lock that can provide access to, or can house a separate key to gain access to a house, apartment, building, or other area. The locking device 115 can comprise a combination of hardware and software components that can facilitate the functionalities of the locking device 115 and communicate with the components of the environment 100. According to embodiments, the mobile device 110 and the locking device 115 can communicate with one another via a secure short-range communication 108. For example, the secure short-range communication can be near field communication (NFC), Bluetooth®, an infrared signal, a barcode scanner, a camera, and/or the like. In some embodiments, the secure short-range communication 108 can be via a WiFi™ or other WLAN connection. In additional embodiments, the secure short-range communication can be a card-emulation protocol, which can allow the mobile device 110 to emulate a Radio-Frequency Identification (RFID) card and communicate with an RFID reader. In further embodiments, the locking device 115 may not directly communicate with the mobile device 110. Rather, in such embodiments, the locking device can communicate directly with the access management application 125 through any form of wired or wireless communication known in the art.

In operation, for example, a first user of the social networking service 120 can grant, to a second user of the social networking service 120, access to the locking device 115 and components thereof via the access management application 125. In embodiments, the second user can be a plurality of users. In some cases, the first user and the second user can be, "friends," "connected," or otherwise part of the same social network of the social networking service 120. Further, in some cases, the first user and the second user can sign-up or otherwise register with the access management application 125 prior to access being granted. In embodiments, the first user can grant access to multiple users and/or a specified social networking group, for example, "close friends," "family members," or members of a particular "circle." Additionally, in other embodiments, the first user can grant to the second user (or multiple users) authorization to further grant, to a third user (or multiple users) of the social networking service, access to the locking device 115.

In further embodiments, the access management application 125 can automatically grant, without explicit instructions from the first user, access to the locking device 115 and components thereof to one or more users, including the second user, that are "friends," "connected," or otherwise part of the same social network of the social networking service 120 with the first user. For example, the access management application 125 can automatically grant all "friends" of the first user access to the locking device 115, or the access management application 125 can automatically grant access to the locking device 115 to "connected" users of the first user that are part of a particular social networking group, such as, for example, "close friends," "family members," etc.

In certain embodiments, the first user of the social networking service 120 can be required to associate a social networking account with the locking device 115 before the access management application can grant access to other users. For example, the access management application can prompt the first user for a serial number associated with the locking device to ensure the first user is authorized to access to the locking device 115.

After the second user is granted access, the access management application 125 can provide a notification, via the social networking service 120, to the second user. In some cases, the second user can receive an SMS, a phone call, an email, or other type of notification that informs the second user that he/she has access to the locking device 115. Further, the notification can comprise an indication of any applicable timeframes associated with the access to the locking device 115. For example, the notification can appear on a calendar within the social networking server 120 indicating the timeframe within which the second user is granted access to the locking device.

In some embodiments, the second user can receive the notification on the mobile device 110, and the notification can comprise a link to or other type of indication of a mobile application 112 that the second user can download to and install on the mobile device 110. In implementations, the mobile application 112 can be associated with and can connect to the access management application 125 and/or the social networking service 120. When the second user initiates or starts the mobile application 112, the mobile application 112 can prompt the user to enter login credentials associated with either the access management application 125 or the social networking service 120. Once the second user is logged into or otherwise authorized with the mobile application 112, the mobile application 112 can connect to the access management application 125 via the network 106, and download or otherwise access the credentials associated with the second user. In embodiments, the credentials can comprise indications and locations of the locking devices (e.g., the locking device 115) or similar components that the second user has access to and/or time periods associated with the access. Additionally, the credentials can comprise digital certificates, security codes, personal identification information, and/or other information.

In some embodiments, to access the locking device 115, the second user can bring the mobile device 110 to a vicinity of the locking device 115 to enable communication between the mobile device 110 and the locking device 115. More particularly, the vicinity can be a distance within which the mobile device 110 can connect to the locking device 115 via the short-range communication 108. Upon detecting a connection to the locking device 115 via the short-range communication 108, the mobile application 112 can prompt the user to "open" or otherwise access the locking device 115. Additionally, in embodiments, the mobile application 112 can indicate that the mobile device 110 has detected the locking device 115, that the second user is authorized to access the locking device 115, and prompt the second user to select whether to open the locking device 115. If the second user declines the option to open the locking device 115, the mobile application 112 can quit, return to a discovery mode, or perform other functions.

In contrast, if the second user selects an option to open the locking device 115, the mobile device 110 can securely communicate with the locking device 115. In some embodiments, locking device 115 can challenge the credentials of the mobile device. For example, the locking device 115 can require RFID tag identification, serial numbers, key exchanges, PINs, and/or access codes for validation. In response to a challenge from the locking device 115, in some embodiments, the mobile device 110 can securely communicate the required information to the locking device 115. In other embodiments, the mobile device 110 can display unlocking information to the second user, such as a PIN or an access code, allowing the second user to manually unlock the locking device 115.

In additional embodiments, the access management application can provide the second user with security information with or without the use of a mobile device, such as a PIN or an access code to enter into the locking device 115, and/or the locking device 115 can prompt the user to verify personal information, such as personal information associated with a social networking account of the second user. For example, the mobile device 110 can display a message from the social networking service that the second user has been granted access to the locking device 115. This message can include a PIN number or an access code. The locking device can prompt the second user to enter the PIN number, access code and/or personal information about the second user. The second user can enter the required information into the locking device 115 using, for example, a keypad on the locking device 115. The locking device 115 can then validate the PIN or access code and/or the personal information before granting the second user access.

In further embodiments, the locking device can communicate directly with the access management application. For example, the second user can select an option to open the locking device 115 using the mobile device 110, and the mobile device 110 can send a command to the access management application. The access management application can then validate the authority of the second user before communicating instructions to the locking device 115 to grant the second user access. In another example, the first user can send a command to the access management application instructing the access management application to further instruct the locking device 115 to grant the second user access.

Once the credentials of the mobile device 110 or the second user have been authenticated, the locking device 115 can physically open or otherwise allow access. For example, the locking device 115 can comprise one or more mechanical components that can be toggled or adjusted by a battery-powered motor to grant access to the contents of the locking device 115. Upon opening, the locking device 115 can provide a confirmation of the opening to the mobile device 110, and the mobile device 110 can transmit the confirmation to the access management application 125. In some cases, the access management application 125 can, directly or via the social networking service 120, provide a notification to the first user that the second user gained access to the locking device 115. Further, the access management application 125 can appropriately update an access data record 130 to reflect the credentials of the mobile device 110, security information provided to the mobile device 110 or the second user, personal information related to the second user and/or that the second user accessed the locking device 115.

In embodiments, the access data record 130 can be stored on the server 105 and implemented by the social networking service 120, as shown in FIG. 1. In other embodiments, the access data record 130 can be stored on the server 105 but not implemented by the social networking service 120, or the access data record 130 can be stored on a separate server. Additionally, the access data record 130 can be stored locally on the device of the first user or the second user, including, for example, the mobile device 110.

Figure 2:
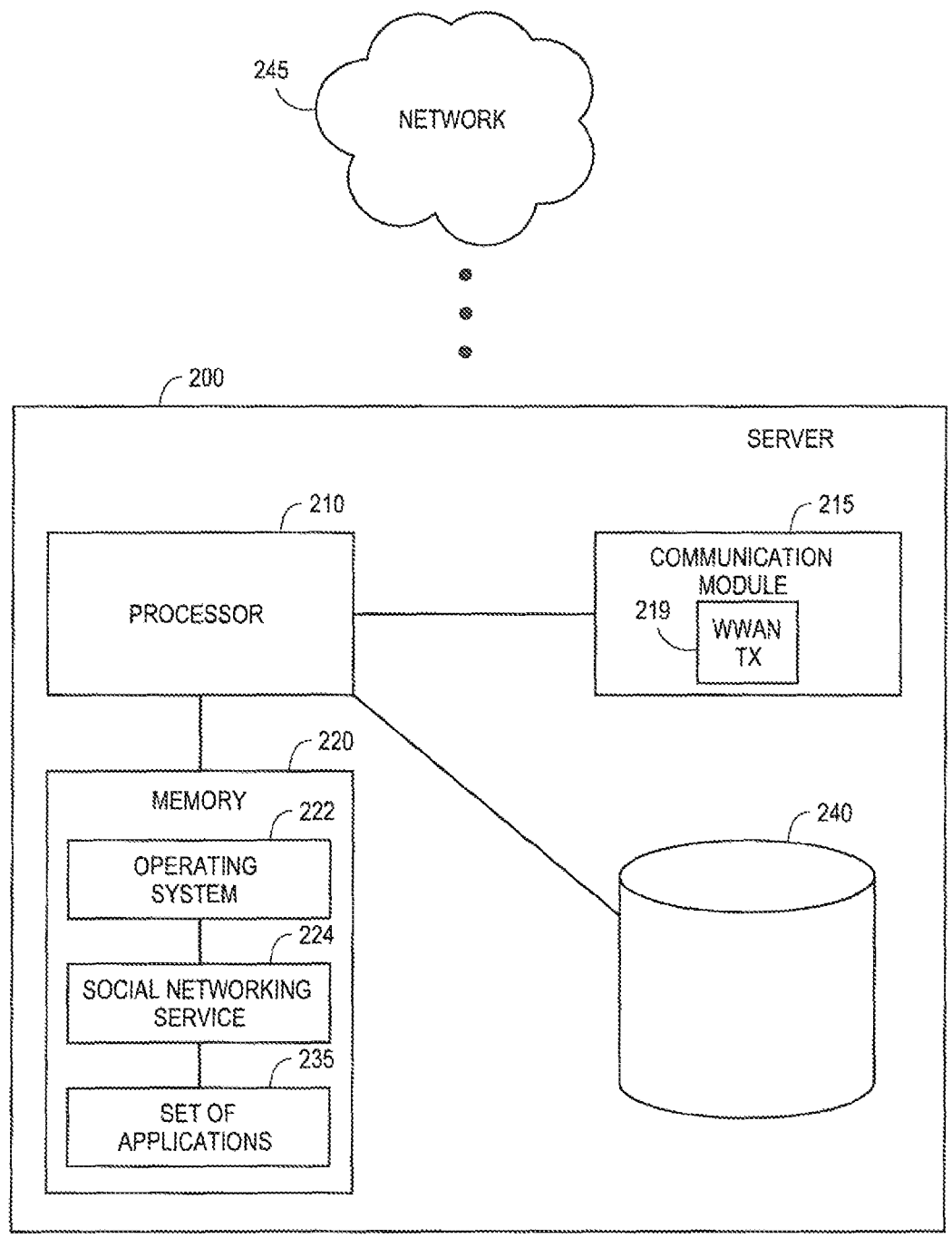
FIG. 2 is a block diagram of an electronic server in accordance with some embodiments.

Referring to FIG. 2, depicted is an exemplary server 200 and components thereof. It should be appreciated that FIG. 2 represents a generalized schematic illustration and that other components and/or entities can be added or existing components and/or entities can be removed or modified.

As shown in FIG. 2, the server 200 can comprise a processor 210 communicating with a memory 220, such as electronic random access memory, or other forms of transitory or non-transitory computer readable storage mediums, operating under control of or in conjunction with an operating system 222. The operating system 222 can be any commercial, open-source, or proprietary operating system or platform. The processor 210 can communicate with a database 240, such as a database stored on a local hard drive. While illustrated as a local database in the server 200, the database 240 can be separate from the server 200.

The processor 210 can further communicate with a communication module 215, such as a wired or wireless data connection, which in turn communicates with a wide area network 245, such as various public or private networks. More particularly, the wide area network 245 can connect the server 200 to one or more mobile devices, such as the mobile device 110 as discussed with respect to FIG. 1, and/or other components. The communication module 215 can comprise a WWAN transceiver 219 (e.g. cellular or WiMAX) that can connect to the wide area network 245.

The processor 210 can communicate with a social networking service 224, such as the social networking service 120 as described with respect to FIG. 1. Further, the processor 210 can communicate with and execute a set of applications 235 that can be configured to execute control logic and perform data processing to perform the functions and techniques as discussed herein. For example, the set of applications 235 can include an access management application, such as the access management application 125 as discussed with respect to FIG. 1. Further, the set of applications 235 can be hosted on or otherwise can interface with the social networking service 224. It should be appreciated that other applications 235 and functionalities are envisioned.

While FIG. 2 illustrates the server 200 as a standalone system using a combination of hardware and software, the components of the server 200 can also be implemented as a software application or program capable of being executed by a conventional computer platform. Likewise, the components of the server 200 can also be implemented as a software module or program module capable of being incorporated in other software applications and programs. In either case, the components of the server 200 can be implemented in any type of conventional proprietary or open-source computer language.

Figure 3:
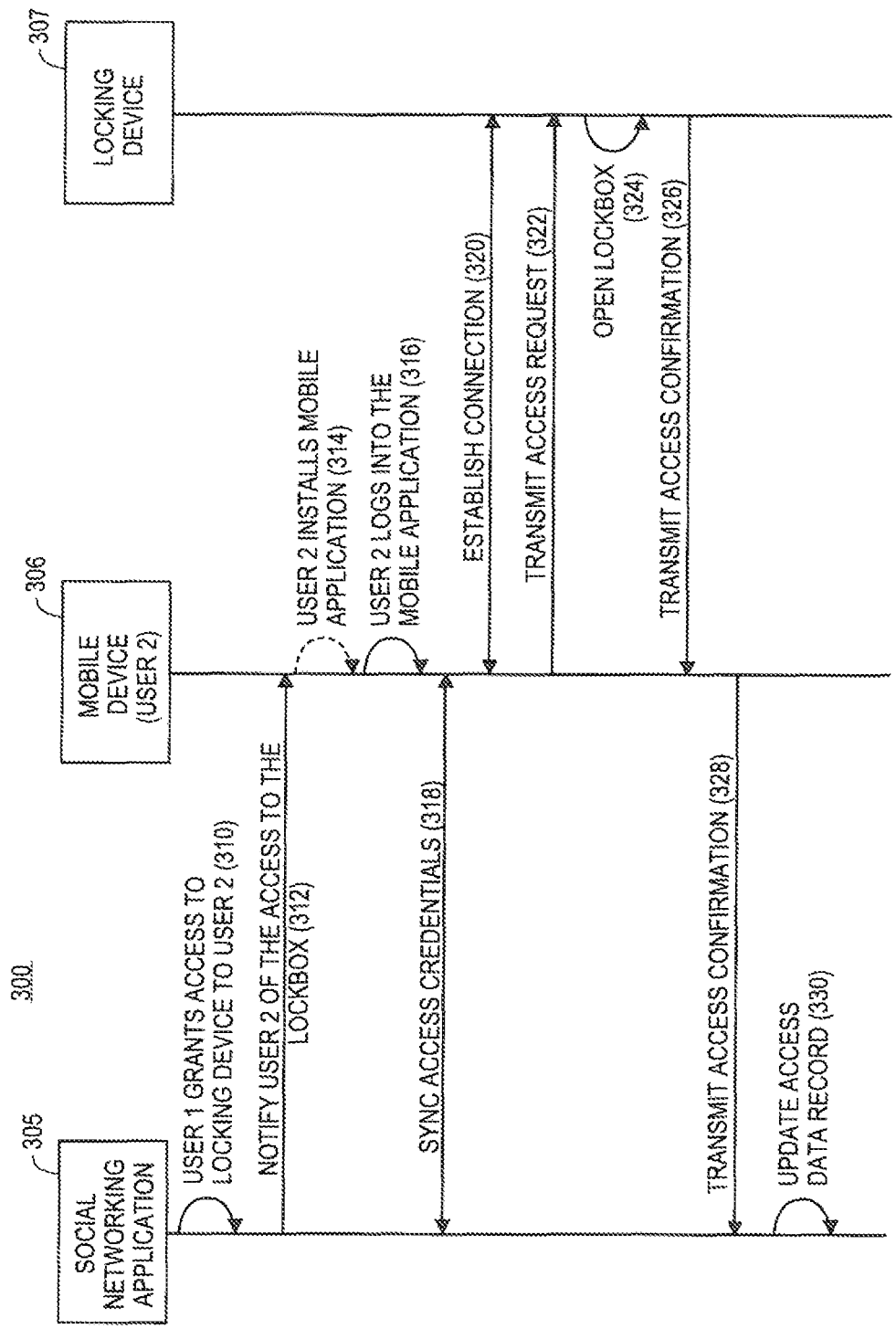
FIG. 3 is a flow diagram depicting managing access to a locking device in accordance with some embodiments.

Referring to FIG. 3, depicted is a flowchart detailing the embodiments as described herein. More particularly, the flowchart details communications and interactions among a social networking application 305, a mobile device 306, and a locking device 307. It should be appreciated that the flowchart of FIG. 3 is merely exemplary and can comprise more or fewer functionalities.

The flowchart 300 begins when User 1 grants (310) access to the locking device 307 to User 2. According to embodiments, User 1 can be connected to User 2 via a social networking service associated with the social networking application 305, and User 1 can grant access to User 2 via an application hosted by the social networking service. The social networking application 305 can notify (312) User 2 of the access to the locking device 307. In some cases, the notification can be an SMS sent to the mobile device 306 of User 2. Using the mobile device 306, User 2 can optionally install (314) a mobile application configured to facilitate the access to the locking device 307. Further, User 2 can log into (316) the mobile application using credentials of the social networking service and/or the mobile application. User 2 can be required to log into the mobile application each time he/she uses the mobile application. Alternatively, User 2 may only be required to log into the mobile application a single time and, thereafter, the mobile device 306 can be synced with a social networking account associated with User 2.

Once User 2 has logged in to the mobile application, the mobile device 306 can sync (318) the access credentials of User 2 with the social networking service. More particularly, the social networking service can indicate to the mobile application that User 2 has been granted access to the locking device 307. The mobile device 306 can establish (320) a connection with the locking device via, for example, a short-range communication. Once the connection is established, the mobile device 306 can transmit (322) an access request to the locking device 307. The locking device 307 can receive the access request, validate the access request and open (324) itself. For example, the locking device 307 can actuate one or more mechanical components to allow access to contents contained therein. The locking device 307 can transmit (326) an access confirmation to the mobile device 306, the mobile device 306 can forward (328) the access confirmation to the social networking service, and the social networking service can update (330) an access data record to reflect User 2 gaining access to the locking device 307.

It has been shown how the present embodiments have been attained. Modification and equivalents of the disclosed concepts are intended to be included within the scope of the claims which are appended hereto.

What is claimed is:

1. A system for managing access to a locking device, comprising:
   a server configured to host a social networking service;
   a processing system comprising one or more processors; and
   a memory system comprising one or more non-transitory computer-readable media, wherein the computer-readable media contain instructions that, when executed by the processing system, cause the processing system to execute an application within the social networking service, wherein the application is configured to perform operations comprising:
   associating a first social networking account with the locking device, wherein the first social networking account is associated with a first user;
   receiving a request via the first social networking account to grant a second user access to the locking device; and
   transferring access data associated with the locking device to the second user, wherein transferring the access data associated with the locking device to the second user comprises transferring the access data to a mobile device;
   receiving an indication that the second user accessed the locking device, the indication that the second user accessed the locking device being generated by the locking device, the indication that the second user accessed the locking device being received from the mobile device.

2. The system of claim 1 wherein the locking device comprises:
   a processing system comprising one or more processors; and
   a memory system comprising one or more non-transitory computer-readable media, wherein the computer-readable media contain instructions that, when executed by the processing system, cause the processing system to perform operations comprising:
   receiving the request to grant the second user access to the locking device;
   authenticating the request; and
   granting the second user access to the locking device.

3. The system of claim 1, the operations further comprising the locking device sending the indication that the second user accessed the locking device.

4. The system of claim 1, wherein authenticating the request comprises one of authenticating information inputted by the second user into the locking device, authenticating the request via the application within the social networking service, or a combination thereof.

5. The system of claim 1, wherein receiving the request to grant the second user access to the locking device comprises receiving access information from the mobile device via short-range communication.

6. The system of claim 1, wherein:
   the second user is associated with a second social networking account; and
   the second social networking account is connected to the first social networking account via the social networking service.

7. The system of claim 6, the operations further comprising receiving a request via the second social networking account to grant a third user access to the locking device.

8. The system of claim 1, wherein the first social networking account is associated with the locking device through authentication of a serial number associated with the locking device.

9. The system of claim 1, wherein the second user is a plurality of users.

10. The system of claim 9, wherein the plurality of users are all members of a social networking group.

11. The system of claim 1, wherein:
    the second user is associated with a second social networking account; and
    the second social networking account is connected to the first social networking account via the social networking service.

12. The system of claim 11, the operations further comprising receiving a request via the second social networking account to grant a third user access to the locking device.

13. The system of claim 1, wherein associating the first social networking account with the locking device comprises authenticating a serial number associated with the locking device.

14. The system on claim 1 wherein the mobile device comprises:

a processing system comprising one or more processors; and a memory system comprising one or more non-transitory computer-readable media, wherein the computer-readable media contain instructions that, when executed by the processing system, cause the processing system to perform operations comprising:

receiving, from the application within the social networking service, access data associated with the locking device, wherein:

the access data was sent by the application in response to the first user sending the request, via the first social networking account, to grant the second user access to the locking device; and the locking device is associated with the first social networking account; and notifying the second user of the access to the locking device.

15. The system of claim 14, wherein notifying the second user of the access to the locking device comprises displaying access information based on the access data.

16. The system of claim 14, the operations further comprising communicating access information to the locking device via short-range communication, wherein the access information is based on the access data.

17. The system of claim 14, wherein:

the second user is associated with a second social networking account; and the second social networking account is connected to the first social networking account via the social networking service.

18. The system of claim 14, wherein the first social networking account is associated with the locking device through authentication of a serial number associated with the locking device.

* * * * *